United States Patent
Fahrbach et al.

(10) Patent No.: US 11,194,149 B2
(45) Date of Patent: Dec. 7, 2021

(54) METHOD FOR EXAMINING A SAMPLE BY MEANS OF LIGHT SHEET MICROSCOPY, AND LIGHT SHEET MICROSCOPE

(71) Applicant: Leica Microsystems CMS GmbH, Wetzlar (DE)

(72) Inventors: Florian Fahrbach, Mannheim (DE); Werner Knebel, Kronau (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 272 days.

(21) Appl. No.: 16/064,533

(22) PCT Filed: Dec. 23, 2016

(86) PCT No.: PCT/EP2016/082518
§ 371 (c)(1),
(2) Date: Jun. 21, 2018

(87) PCT Pub. No.: WO2017/109156
PCT Pub. Date: Jun. 29, 2017

(65) Prior Publication Data
US 2019/0086656 A1   Mar. 21, 2019

(30) Foreign Application Priority Data
Dec. 23, 2015   (LU) .......................... 92925

(51) Int. Cl.
*G02B 21/36*   (2006.01)
*G02B 7/04*   (2021.01)
(Continued)

(52) U.S. Cl.
CPC .............. *G02B 21/367* (2013.01); *G02B 7/04* (2013.01); *G02B 21/006* (2013.01);
(Continued)

(58) Field of Classification Search
CPC .............. G02B 21/367; G02B 21/0032; G02B 21/006; G02B 21/0076; G02B 27/0068; G02B 7/04
See application file for complete search history.

(56) References Cited

U.S. PATENT DOCUMENTS 6,052,223 A * 4/2000 Yoneyama ............. G02B 21/00
359/381
6,320,699 B1   11/2001 Takanori et al.
(Continued)

FOREIGN PATENT DOCUMENTS

| CN | 104407436 A | 3/2015 |
|---|---|---|
| DE | 2746 C | 1/1878 |

(Continued)

OTHER PUBLICATIONS

Written Opinion of PCT/EP2016/082518, dated Jun. 29, 2017.
(Continued)

*Primary Examiner* — Oschta I Montoya
(74) *Attorney, Agent, or Firm* — Leydig, Voit & Mayer, Ltd.

(57) ABSTRACT

A method for examining a sample by light sheet microscopy includes illuminating a sample surface located in an illumination plane by a light sheet propagating in the illumination plane. A position of a light sheet focal point of the light sheet in the illumination plane is moved by changing an optical length of a light path of illumination light forming the light sheet. Detection light emanating from the illumination plane is detected.

21 Claims, 11 Drawing Sheets

(51) Int. Cl.
    *G02B 21/00* (2006.01)
    *G02B 27/00* (2006.01)
(52) U.S. Cl.
    CPC ..... *G02B 21/0032* (2013.01); *G02B 21/0076* (2013.01); *G02B 27/0068* (2013.01)

(56) References Cited

U.S. PATENT DOCUMENTS

| | | | |
|---|---|---|---|
| 10,012,826 | B2 | 7/2018 | Werner et al. |
| 2006/0033987 | A1 | 2/2006 | Ernst et al. |
| 2012/0200693 | A1 | 8/2012 | Helmut et al. |
| 2015/0205087 | A1 | 7/2015 | Christian |
| 2015/0286042 | A1* | 10/2015 | Hilbert .............. G02B 21/16 250/459.1 |
| 2016/0048012 | A1* | 2/2016 | Ebel .................. G02B 21/16 359/385 |
| 2016/0048014 | A1 | 2/2016 | Werner et al. |
| 2018/0120548 | A1* | 5/2018 | Fahrbach ......... G02B 21/0048 |

FOREIGN PATENT DOCUMENTS

| | | |
|---|---|---|
| DE | 10257423 A1 | 6/2004 |
| DE | 102009044983 A1 | 3/2011 |
| DE | 102012214568 A1 | 2/2014 |
| DE | 102013205115 A1 | 9/2014 |
| DE | 102013213781 A1 | 9/2014 |
| DE | 102013112601 A1 | 5/2015 |
| EP | 2648029 A2 | 10/2013 |

OTHER PUBLICATIONS

"Large-field high-resolution two-photon digital scanned light-sheet microscopy", Open Letter to the Editor; Cell Research 1-4, Sep. 26, 2014, pp. 1-4.

Kevin M. Dean, et al., "Uniform and scalable light-sheets generated by extended focusing", Optics Express, vol. 22, No. 21, Oct. 16, 2014, pp. 1-12.

* cited by examiner

METHOD FOR EXAMINING A SAMPLE BY MEANS OF LIGHT SHEET MICROSCOPY, AND LIGHT SHEET MICROSCOPE

CROSS-REFERENCE TO PRIOR APPLICATIONS

This application is a U.S. National Stage Application under 35 U.S.C. § 371 of International Application No. PCT/EP2016/082518 filed on Dec. 23, 2016, and claims benefit to Luxembourgian Patent Application No. LU 92925 filed on Dec. 23, 2015. The International Application was published in German on Jun. 29, 2017 as WO 2017/109156 A1 under PCT Article 21 (2)

FIELD

The invention relates to a method for examining a sample by means of light sheet microscopy, a sample layer located in an illumination plane being illuminated by means of a light sheet propagating in the illumination plane, and detection light emanating from the illumination plane being detected.

The invention further relates to a light sheet microscope comprising an illumination objective, which focuses a light sheet in order to illuminate a sample layer by means of the light sheet propagating in the illumination plane, and comprising a detection objective, through which detection light emanating from the illumination plane reaches a detector.

BACKGROUND

Light sheet microscopy, also referred to as the SPIM (single plane illumination microscopy) technique, in which the sample is illuminated layer by layer, makes it possible to collect image data more quickly and in a manner which causes less damage to samples than for example scanning a sample point by point. A known field of use of SPIM technology is the field of fluorescence microscopy, in which fluorophores in the sample are stimulated with laser light. In SPIM technology, stimulation takes place only in a plane illuminated by an illumination light sheet. Damage to the sample by illumination light in other planes is prevented as a result of this.

An optical device operating according to the SPIM process is described in DE 102 57 423 A1. In the case of this microscope, a sample is illuminated with a thin light sheet, while the observation takes place perpendicularly to the plane of the illuminating light sheet. In this case, the illumination and detection take place by means of two separate optical beam paths each having separate optics, in particular having two separate objectives which are perpendicular to each other.

DE 10 2009 044 983 A1 discloses a microscope which comprises an illumination device, by means of which a light sheet for illuminating a region of a sample is generated, which sheet is extended in an approximately planar manner in the direction of an illumination axis of an illumination beam path and in the direction of a transverse axis which lies transversely to the illumination axis. The microscope further comprises a detection apparatus, by means of which light which is emitted from the sample region along a detection axis of a detection beam path is detected, the illumination axis and the detection axis, and the transverse axis and the detection axis being at a non-zero-degree angle to one another, and the detection apparatus further comprising a detection objective in the detection beam path. In the case of such a microscope, the detection apparatus further comprises a detection element which is arranged so as to be spatially separated from a front lens of the detection objective and is adjustable independently thereof, by means of which element the size of a detection image field can be varied steplessly, and/or by means of which element a detection focal plane can be shifted steplessly in the sample region.

Dean, K. & Fiolka, R., "Uniform and scalable light sheets generated by extended focusing", Opt. Express 22, 26141-26152 (2014) discloses a system in which a thin, short illumination beam is shifted forward and backward along the optical axis by a quickly adjustable lens. As a result of the shallower depth of field of the beam, said beam can be thinner, which is intended to increase the image contrast. However, since the out-of-focus region of the beam fluorescence is also stimulated, a slit aperture is used to achieve the desired effect. Said slit aperture extends in a conjugated plane in the detection beam path collinearly with the illumination beam. Despite using the slit aperture, the increase in the image contrast is relatively small, in particular because a lot of fluorescence light that has not been stimulated by the focal point of the illumination beam is detected.

Zong, W. et al. "Large-field high-resolution two-photon digital scanned light-sheet microscopy" Cell Res. (2014) discloses a similar microscope in which, however, non-linear fluorescence stimulation takes place. CN 10 440 74 36 also describes such a microscope.

SUMMARY

In an embodiment, the present invention provides a method for examining a sample by light sheet microscopy. A sample layer located in an illumination plane is illuminated by a light sheet propagating in the illumination plane. A position of a light sheet focal point of the light sheet in the illumination plane is moved by changing an optical length of a light path of illumination light forming the light sheet. Detection light emanating from the illumination plane is detected.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. In the drawings, the subject matter is shown schematically and by way of example and is described in the following with reference to the drawings, in which elements which are like or have the same effect are usually provided with the same reference signs. The features and advantages of various embodiments of the present invention will become apparent by reading the following detailed description with reference to the attached drawings which illustrate the following.

DETAILED DESCRIPTION

Figure 1:
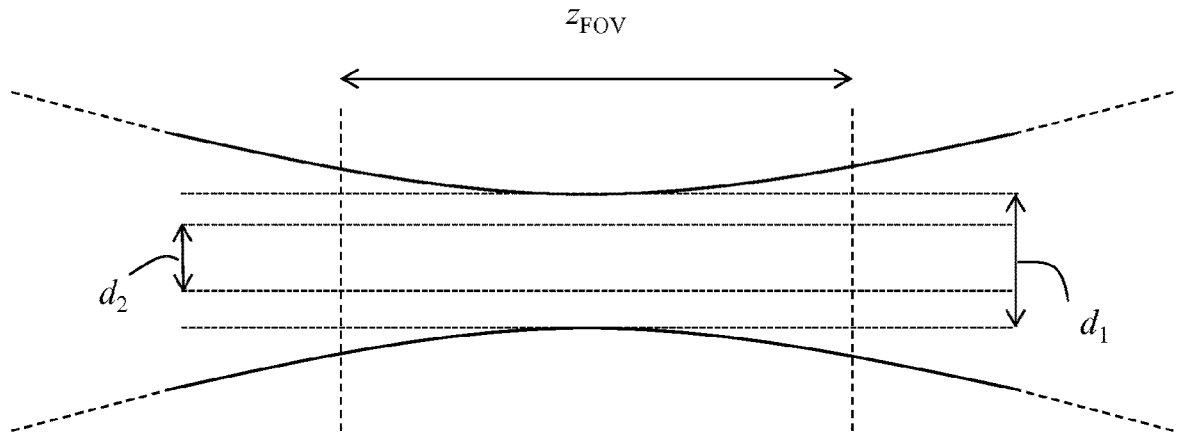
FIGS. 1 and 2 are illustrations of the procedure for achieving an increase in resolution.

Methods in which adjustable lenses are used have the disadvantage of not being implementable in practice due to the spatial conditions present in the case of conventional microscopes. Furthermore, the use of adjustable lenses is problematic in particular for the following reason: Currently, there are principally two types of adjustable lenses: "Electrically tunable lenses" (ETL), in which the volume of the lens is physically changed by displacing a fluid in order to change the optical power, or "Tunable acoustic gradient index lenses", in which, by means of fluctuations in thickness, the index of refraction and thus the optical power are changed. Whereas ETLs which have cutoff frequencies in the range of 100 Hz are disadvantageously slow, TAG lenses are resonant at frequencies of at least several $10^5$ Hz. As a result of the frequency spectra thereof, both types of lens are unsuitable for allowing a sawtooth-shaped movement of a focal point. It is completely impossible to position TAG lenses statically in any desired position, and in the case of ETLs, the position is disadvantageously subject to drift over time.

According to an embodiment, the present invention provides a method which makes it possible to quickly and reliably generate images of a sample layer with a high resolution.

The method according to an embodiment provides that a position of a light sheet focal point of the light sheet in the illumination plane is moved by changing the optical length of the light path of the illumination light forming the light sheet.

Another embodiment of the present invention provides a light sheet microscope which makes it possible to quickly and reliably generate images with a high resolution.

This light sheet microscope according to an embodiment provides that a light sheet focal point shifting means is arranged in the beam path of the illumination light forming the light sheet, by which means a position of a light sheet focal point of the light sheet in the illumination plane can be moved by changing the optical length of the light path of the illumination light.

The static illumination known from the prior art, which is mostly conventional in light sheet microscopy and comprises a light sheet, the focal point of which is arranged in the center of the image field, and the depth of field of which is adapted to the size of the image field along the illumination axis, leads to the thickness of the light sheet being greater than required when only smaller, in particular non-centrally located, cut-outs from the image region are of interest. As explained in detail further below, an embodiment of the present invention makes it possible always to use a thinner light sheet and to utilize this for the purpose of generating high-contrast images, in a simple yet very reliable manner. This can be achieved in particular, as explained in detail further below, by focusing the light sheet more strongly, which results in a light sheet focal point which is thinner and shorter in the direction of light propagation, but also in a greater thickness of the illumination light beam, wherein solely the detection light emanating from the region illuminated by means of the light sheet focal point is detected, however. By axially shifting the light sheet focal point along the direction of light propagation within the illumination plane, the entire sample layer of interest which is located in the illumination plane can be depicted successively in high contrast.

An embodiment of the invention has the particular advantage that it makes it possible to shift the light sheet focal point within the illumination plane in the direction of light propagation or in the opposite direction thereto in a simple, yet very reliable manner which is not susceptible to faults. Furthermore, in an extremely advantageous manner, embodiments of the invention can also be implemented in conventional microscope assemblies, in particular in microscope assemblies which comprise a commercially available microscope stand, because the installation space regions which are conventionally free in such microscope assemblies can be used for the light sheet focal point shifting means described in detail further below.

By changing the optical length of the light path of the illumination light, in particular a change in the position of the light sheet focal point is achieved when the light sheet focal point shifting means is arranged in a non-collimated part of the illumination light beam.

In one particular embodiment, to change the optical length of the light path of the illumination light, transparent blocks having different thicknesses and/or having different indexes of refraction are introduced into the light path in particular in a motor-controlled, successive manner. This can take place for example in that a block already introduced for a first shift of the light sheet focal point remains in the beam path, and in that another block is additionally introduced into the beam path for a further shift.

Alternatively, it is also possible in particular to implement step-by-step shifting in that transparent blocks having different thicknesses and/or having different indexes of refraction are introduced into the light path successively and interchangeably in each case. A light sheet focal point shifting means which is predestined in particular for this purpose can comprise a plurality of blocks having different thicknesses and/or having different indexes of refraction.

In one design, which is particularly precise and quick to adjust and is designed for this purpose, the blocks are interconnected to form an arc or a closed ring, wherein the arc or the ring is rotated, in particular rotated about the optical axis or an axis in parallel with the optical axis, to change the optical length. In this way, the respective block located in the beam path can be replaced with another block quickly, the thickness and/or the index of refraction of the shone-through region of the ring being dependent on the respective rotational position of the arc or the ring. Preferably, the rotation is controlled by a motor.

The ring of blocks can advantageously be in particular in the form of a stepped ring having a thickness of blocks which increases along a helix and which falls off step-wise at an angle of 360 degrees from the thickest block to the thinnest block. By means of such a design, the light sheet focal point can be shifted relatively slowly in the direction of light propagation or in the opposite direction thereto by rotating the stepped ring, in particular in a motor-controlled manner, a quick return to the slow shifting taking place before the slow shifting process repeats.

The blocks can be in the form of blocks which can be separated from one another in a non-destructive manner. A design in which the blocks are different regions of an integrally produced member is particularly robust and easy to handle.

As an alternative to the above-mentioned designs, it can also be provided that an element shone through by the illumination light and having a thickness which increases continuously along a web and/or having an index of refraction which increases continuously along a web is moved relative to the beam path of the illumination light to change the optical length of the light path. The element can have an in particular annular design and can be rotatably mounted in such a way that the thickness and/or the index of refraction of the respectively shone-through region is dependent on the rotational position of the element. In particular, the element can be mounted so as to be able to rotate about the optical axis of the beam path of the illumination light beam or the direction of propagation of the illumination light beam or about an axis in parallel with the optical axis.

In the case of another alternative, two transparent wedge-shaped or annular elements arranged in the beam path of the illumination light are moved relative to each other, in particular in a motor-controlled manner, to change the optical length of the light path. In this case, it can advantageously be provided in particular that one of the wedge-shaped or annular elements comprises an entry face, and the other of the wedge-shaped or annular elements comprises an exit face for the illumination light, the entry face and the exit face being arranged in parallel with one another. The wedge-shaped or annular elements can be in contact with one another in a contact plane, in particular via an immersion fluid, such as an oil immersion. Such a design prevents a beam offset between the incoming and the outgoing illumination light when the entry face and the exit face are located perpendicularly to the optical axis of the illumination optics.

As has already been mentioned, it can advantageously be provided that in each case, solely detection light from the respective region illuminated by the light sheet focal point is detected. This is carried out in particular in such a way that the image data successively obtained in this case are assembled to form an overall image of the sample layer scanned in this manner.

To ensure that in each case, solely detection light from the respective region illuminated by the light sheet focal point is detected, in the case of one particular design, a detection region of a detector is moved in sync with the movement of the light sheet focal point. The detection region can be in particular the respective active part of an area detector, for example of a CMOS detector or sCMOS detector. It is for example advantageously possible to read out only part of the area detector, namely the part which corresponds to the gap detector (active part), whereas the remaining parts of the area detector, namely the parts located outside the gap detector, are not read out (non-active part).

In the case of such a design, mechanical components such as an aperture slit are avoided. Similarly, such a design has the particular advantage of long durability, because wear as a result of movement, for example of mechanical apertures, is avoided. Alternatively, however, it is also possible to connect a mechanical aperture slit upstream of the detector, which aperture slit is moved in sync with the light sheet upstream of the detector to ensure that, in each case, only the detection light from the region of the light sheet focal point reaches the detector.

In one particularly advantageous embodiment, at least one adjustable beam deflection means which is synchronized with the movement of the light sheet is arranged in the detection beam path, which beam deflection means makes it possible to move the image of the region of interest into the center and/or into the read-out region of the area detector. This has the particular advantage that the read-out speed is thus considerably increased. It is not just a case (even though it is possible) of merely enlarging the central region of the image field using zoom and telescopic lenses. In fact, it is a case of in particular depicting various regions of interest of the sample with high resolution, which is not possible by means of the devices known from the prior art due to the thickness of the light sheet of these devices which is mentioned at the outset. The present invention makes it possible to examine a region of interest or successively examine a plurality of regions of interest with high resolution without having to move the sample for this purpose.

Moving the image of the region of interest into the center and/or into the read-out region of the area detector arranged in the detection plane is advantageous in particular when the read-out speed (for example the camera read-out speed and/or the frame rate), for equally large regions of interest is dependent on the position of the image of the regions of interest on the area detector, such as in the case of the currently conventional sCMOS detectors.

The light sheet can be generated for example from an illumination light beam originally having a round cross section, in particular by means of a cylindrical lens. Within the meaning of the present invention, a cylindrical lens is understood to mean any astigmatic lens and/or any lens which focuses more strongly in one direction which is perpendicular to the direction of propagation of the illumination light beam than in another direction which is perpendicular to the direction of propagation of the illumination light beam. However, other shapes of light sheet are also possible. These include light sheets shaped by Bessel beams, Mathieu beams, Airy beams, and the coherent superposition of the mentioned beams.

It is also possible for the light sheet to be a quasi-light sheet which consists of an illumination light beam which is continuously moved back and forth in the illumination plane. In particular, it can be provided that a beam-deflecting device which is adjustable with respect to the deflection angle thereof is used, which device moves (scans) a primary illumination light beam back and forth in the illumination plane to generate a quasi-light sheet so quickly that, for example within one detection cycle or within the exposure time of the detector, the illumination light beam passes over the object field completely at least once. The back-and-forth movement of the primary illumination light beam can be generated for example by at least one tiltably or pivotally arranged mirror which is moved by an actuator, or by an optical—preferably acousto-optical-deflector of a scanning unit.

In a particularly advantageous embodiment, the light sheet focal point shifting means is connected downstream of the illumination objective and/or is spatially arranged between the illumination objective and the sample. Such an embodiment is not dependent on the installation space inside a microscope stand, but rather advantageously utilizes the clearance in front of the illumination objective and thus the large operating distance of the illumination objective conventionally used in light sheet microscopy. In particular, light sheet focal point shifting means of the above-described ring formed from blocks or the annular element can be arranged advantageously and in a space-efficient manner coaxially with the illumination objective, in particular in front of the front lens of the illumination objective.

The light sheet focal point shifting means can be attached for example to a microscope stand. In the case of one particularly compact design, the light sheet focal point shifting means is attached to the illumination objective.

The light sheet microscope can be constructed for example in such a way that the optical axis of the illumination objective is oriented perpendicularly to the optical axis of the detection objective.

In the case of another particularly advantageous design, the optical axis of the illumination objective and the optical axis of the detection objective are oriented in parallel with or coaxially with one another. Alternatively or additionally, it can also be provided that the detection objective and the illumination objective are oriented so as to be opposite and facing each other, and/or in that a sample holder is spatially arranged between the detection objective and the illumination objective, which holder defines an examination position for a sample to be examined. Such a design has the particular advantage that the light sheet microscope can be particularly compact and robust, and that the examination position for the sample is particularly easy to access so that it is possible to successively take the samples into the examination position quickly and precisely.

The light sheet microscope can advantageously comprise a deflection means which deflects the illumination light after said light has passed through the illumination objective in such a way that the light extends in the illumination plane. In particular, the deflection means can be arranged in such a way that the deflected illumination light beam is at a non-zero-degree angle to the optical axis of the illumination objective and/or of the detection objective. In particular, the illumination plane can be oriented perpendicularly to the optical axis of the illumination objective.

In particular, it can advantageously be provided that the illumination light firstly extends in a vertical direction through the illumination objective and subsequently is deflected in a horizontal direction by the deflection device in order to illuminate the sample in the illumination plane along the illumination strip. Preferably, the detection light emanating from the illuminated sample region, in particular fluorescence light, extends in a vertical direction through a detection objective. Such a construction makes it possible to use upright or inverted standard microscope stands to produce the light sheet microscope according to the invention.

In one particularly advantageous embodiment, it is provided that the illumination objective and the deflection device, which can comprise for example one or more deflection mirrors, are mounted so as to be movable relative to one another so as to be able to move the light sheet relative to the sample. Alternatively or additionally, it can also be provided that the deflection device is attached to the detection objective, in particular in a movable manner.

A light sheet microscope, which is suitable in particular for carrying out the method according to the invention, can advantageously be constructed on the basis of a scanning microscope, in particular a confocal scanning microscope. In this case, in particular an inverted microscope stand can be used. Similarly, it is particularly advantageous to use a scanning microscope (which may already be present in a laboratory) to carry out the method according to the invention.

In one particularly advantageous embodiment, the above-described method is carried out multiple times simultaneously for one sample. This has the particular advantage for example that different sample regions can be examined simultaneously. These sample regions can be located in the same illumination plane or in different illumination planes.

Means for compensating for the aberrations brought about by the light sheet focal point shifting means—which is for example in the form of a glass block—(corrector plates) could be inserted in the beam path.

In particular, corrector plates having a profile for correcting spherical aberrations, which are also commercially available, could be introduced. One option consists in providing a matching corrector plate for every thickness of the light sheet focal point shifting means. Such an assembly of corrector plates can be rotated together with the ring of blocks or the stepped ring. The corrector plates could also be integrated in the blocks. More simply, the average thickness of the stepped ring can also be compensated by a fixed corrector plate to thus at least reduce the (spherical) aberrations.

Alternatively, the objective can also be accordingly designed so that the transmission through a glass block having an average thickness leads to a corrected focal point. This corresponds to a cover glass correction, or the correction which is required for a specific penetration depth into a medium having a higher index of refraction than that of air. Objectives are also available which can be adjusted to different cover glass thicknesses or different penetration depths by means of what is known as a correction ring. Said correction rings can also be adjustable in a motorized manner. A (predominantly) aberration-free focal point can also be achieved by synchronizing the movement of a correction ring of an objective with the movement of a light sheet focal point shifting means so that the correction matching the glass block used in each case is always used.

The light sheet focal point shifting means and the correction plates do not have to be located between the objective and the object, but rather can also be located closer to the light source in planes conjugated thereto, ideally in front of a scanning unit for generating a quasi-light sheet. However, should the correction be required behind the scanning unit, a problem occurs in the correction as a result of the movement of the beam. In this case, it is expedient to dispense with the correction along the scanning axis, since the beam propagation and aberrations along said axis should not have any adverse effects on the thickness of the light sheet and thus on the image quality. In principle, the correction plates do not have to be polar symmetrical (when generating the light sheet using a cylindrical lens or by scanning the beam), since the spherical aberrations only have to be corrected perpendicularly to the light sheet plane, and not within the light sheet plane. A $y^4$ profile is thus sufficient for example when the propagation of the light sheet extends along the x-axis.

The glass block can also be formed by a plurality of parts which, in some circumstances, are not planar but rather curved and could be cemented on the mutually facing faces (correction of aberrations).

Figure 2:
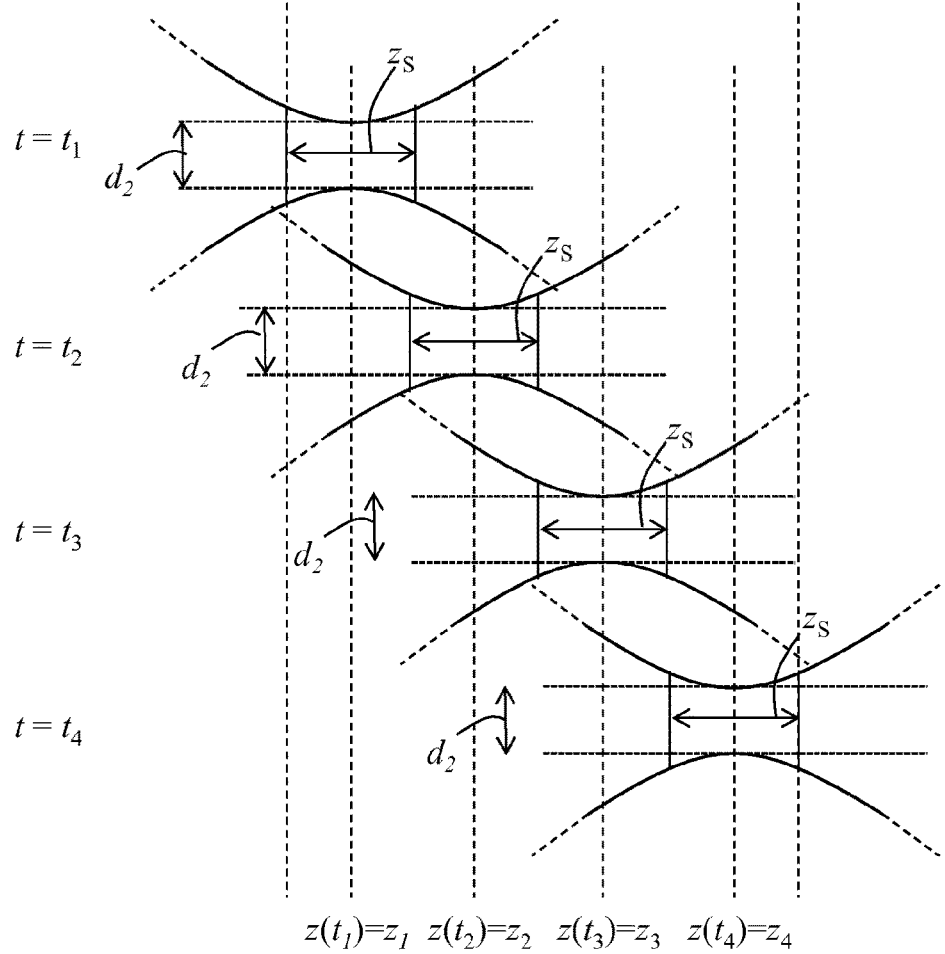

FIGS. 1 and 2 show an illustration of the procedure for achieving an increase in resolution, FIG. 1 showing conventional lighting using a light sheet having a large focal length $z_{FOV}$, whereas FIG. 2 shows the scanning of the sample region of interest by successively moving a light sheet having a smaller focal length $z_s$. It can clearly be seen that the effective thickness $d_1$ of the light sheet having the large focal length $z_{FOV}$ (FIG. 1) is substantially greater than the effective thickness $d_2$ of the light sheet having the smaller focal length $z_s$ (also marked in FIG. 1 for comparison).

It is simplest if an image is recorded and the strips located within the depth of field of the focal point where the light sheet is at the narrowest/thinnest are cut out of these images in a post-processing step. Since unnecessary data are recorded by the camera and transmitted to the PC for this mode, it is better to shift the read-out region of the camera in sync with the shift of the light sheet focal point. The actual image of the whole region to be depicted is assembled from these strips, the number n of which results from the ratios $n=Z_{FOV}/Z_s$.

Figure 3:
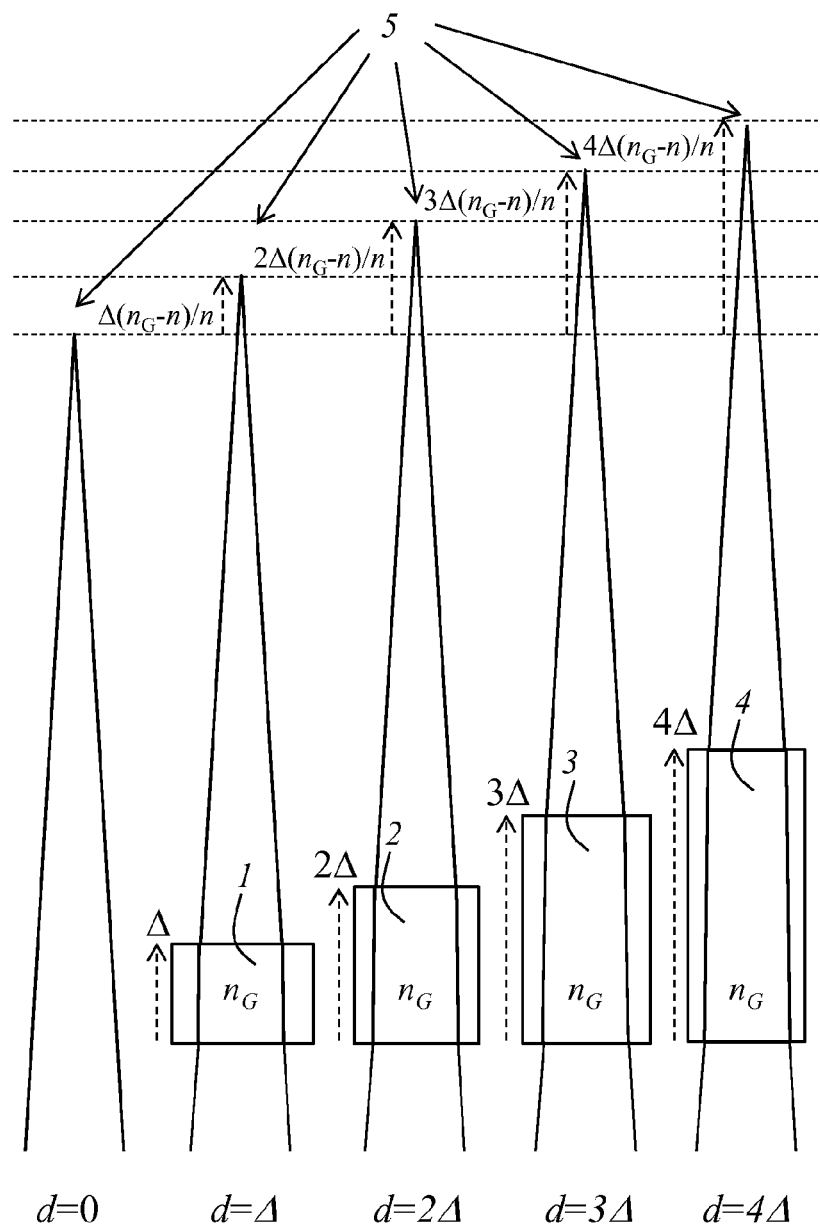
FIG. 3 is an illustration of the principle of using transparent blocks to shift the light sheet focal point.

FIG. 3 is an illustration of the principle of using transparent blocks 1, 2, 3, 4 to change the optical length of the light path of the light sheet and thus shift the light sheet focal point by comparison with the focal position in a beam path without a block (view furthest to the left).

The block 1 having the thickness Δ and having the index of refraction $n_G$ and comprising plane-parallel surfaces which are perpendicular to the direction of propagation brings about an offset of the light sheet focal point 5 by Δ(nG−n)/n along the optical axis in the beam path of a convergent light sheet, n being the index of refraction of the surrounding medium. The block 2 which has twice the thickness consequently brings about twice the offset. If different blocks 1, 2, 3, 4 are then inserted in the beam path one after the other, the light sheet focal point 5 can be axially shifted in discrete steps.

Figures 4, 5:
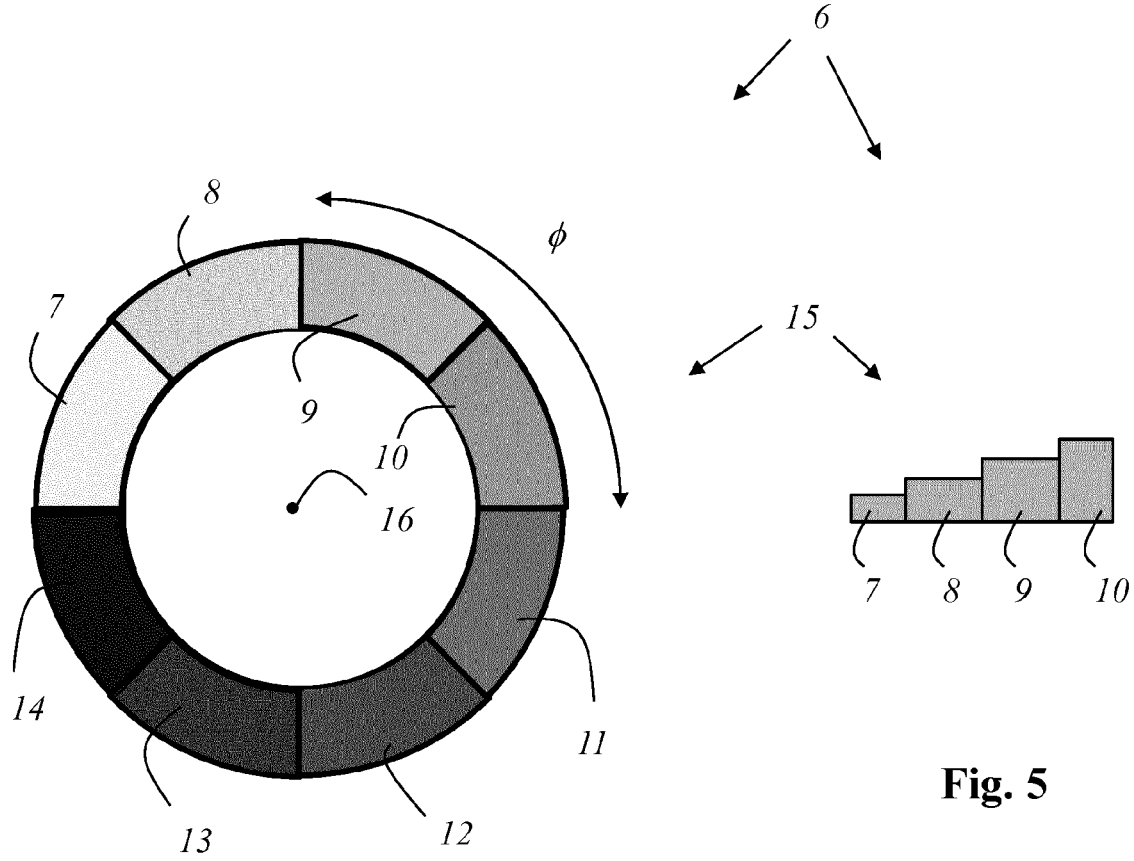
FIG. 4 is a front view of a first embodiment of a light sheet focal point shifting means.
FIG. 5 is a side view of the first embodiment of a light sheet focal point shifting means.
Figure 6:
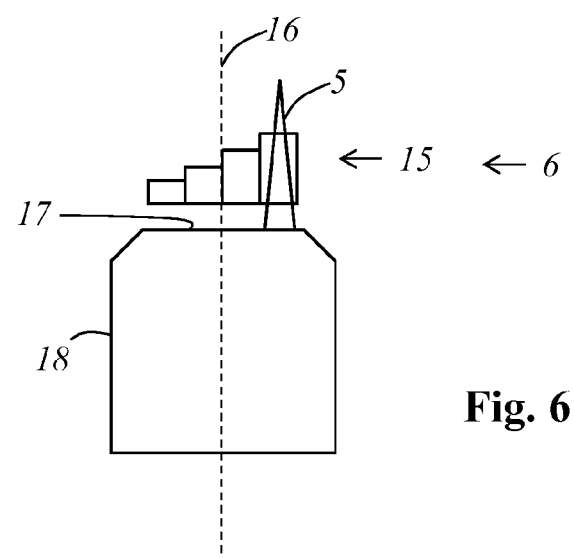
FIGS. 6 and 7 show a possible arrangement from the first embodiment of the light sheet focal point shifting means in a side view and in a plan view of the front lens.
Figure 7:
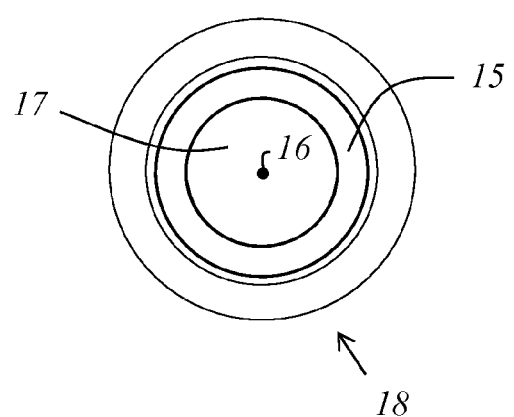

FIG. 4 is a front view and FIG. 5 is a side view of a first embodiment of a light sheet focal point shifting means 6. The light sheet focal point shifting means 6 comprises a first block 7 having the thickness Δ, a second block 8 having the thickness 2Δ, a third block 9 having the thickness 3Δ, a fourth block 10 having the thickness 4Δ, a fifth block 11 having the thickness 5Δ, a sixth block 12 having the thickness 6Δ, a seventh block 13 having the thickness 7Δ, and an eighth block 14 having the thickness 8Δ. The blocks 7-14 form a closed ring 15, wherein the ring 15 is mounted so as to be able to rotate, in particular rotate about the optical axis 16 (which is perpendicular to the drawing plane) or about an axis in parallel with the optical axis 16, to change the optical length. In this way, the respective block 7-14 located in the beam path can be replaced with another block 7-14 quickly, the thickness and/or the index of refraction of the shone-through region of the ring 15 being dependent on the respective rotational position φ of the ring 15. As shown in FIGS. 6 and 7, the ring 15 can be mounted in front of the front lens 17 of the illumination objective 18 so as to be able to rotate about the optical axis 16. The ring could also be formed of individual blocks having the same thickness, but different indexes of refraction, so that different optical lengths of the light paths can be achieved as a result.

Figure 8:
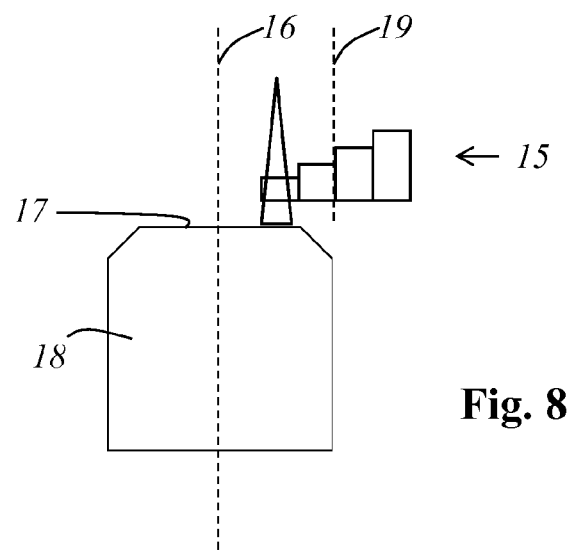
FIGS. 8 and 9 show another possible arrangement from the first embodiment of the light sheet focal point shifting means in a side view and in a plan view of the front lens.
Figure 9:
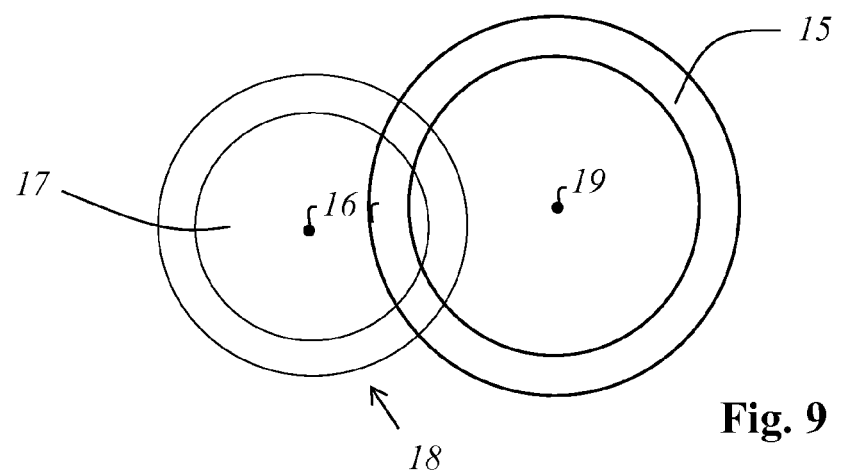

It is also possible for the ring 15 to be arranged laterally offset in front of the illumination objective 18 in such a way that said ring can be rotated about an axis 19 in parallel with the optical axis 16, as illustrated in FIGS. 8 and 9.

Figure 10:
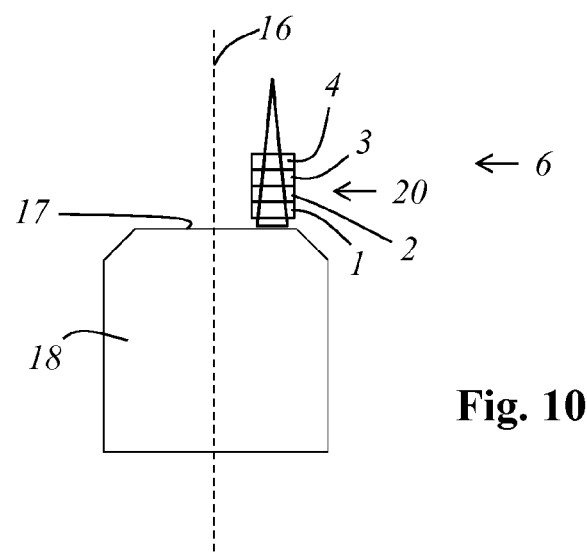
FIGS. 10 and 11 show a possible arrangement from a second embodiment of the light sheet focal point shifting means in a side view and in a plan view of the front lens.
Figure 11:
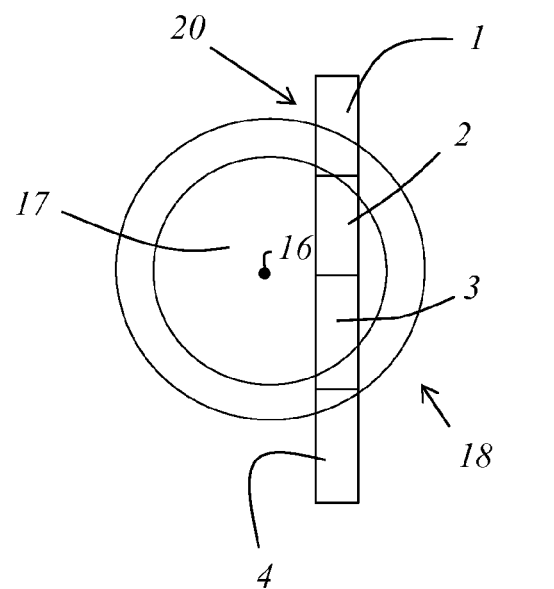

Alternatively, the transparent blocks 1, 2, 3, 4 can also be arranged in a side-by-side arrangement 20 and interconnected, said arrangement being mounted in a linearly movable manner in front of the illumination objective 18, as illustrated in FIGS. 10 and 11. For movement, as in the other embodiments, for example an electronic control device can be present, which controls a drive motor to move the blocks 1-4.

Figure 12:
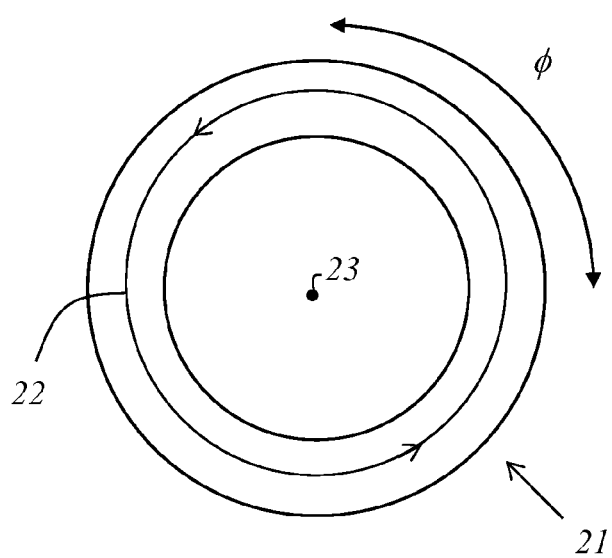
FIGS. 12 and 13 are a front view and a side view of a third embodiment of a light sheet focal point shifting means.
Figure 13:
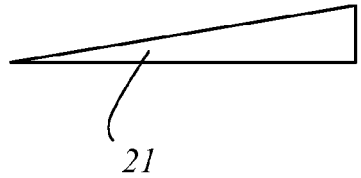

FIGS. 12 and 13 are a front view and a side view of a third embodiment of a light sheet focal point shifting means 6. The light sheet focal point shifting means 6 comprises an annular element 21 which is shone through by the illumination light (propagating perpendicularly to the drawing plane), said element having a thickness which increases continuously along a circular web 22. To change the optical length, the element is rotated about the central axis of symmetry 23 thereof (which is perpendicular to the drawing plane).

The thickness of the annular element 21 is continuously dependent on the angle φ=arctan(x/y), the direction of propagation of the illumination light being the z direction, and x and y being perpendicular thereto. The central axis of symmetry 23 is oriented in the z direction, thus the following applies: $\Delta=d_{max}/2\pi*\phi$, or a wedge $\Delta=x*d_{max}/2\pi r$, r being the radius of the above-mentioned web of the annular element 21.

In the case where an illumination objective 18 having a low NA and a large image field is used, it is possible to still use the region of the image field of the illumination objective 18 which is not covered by the annular element 21 for detection.

Figure 14:
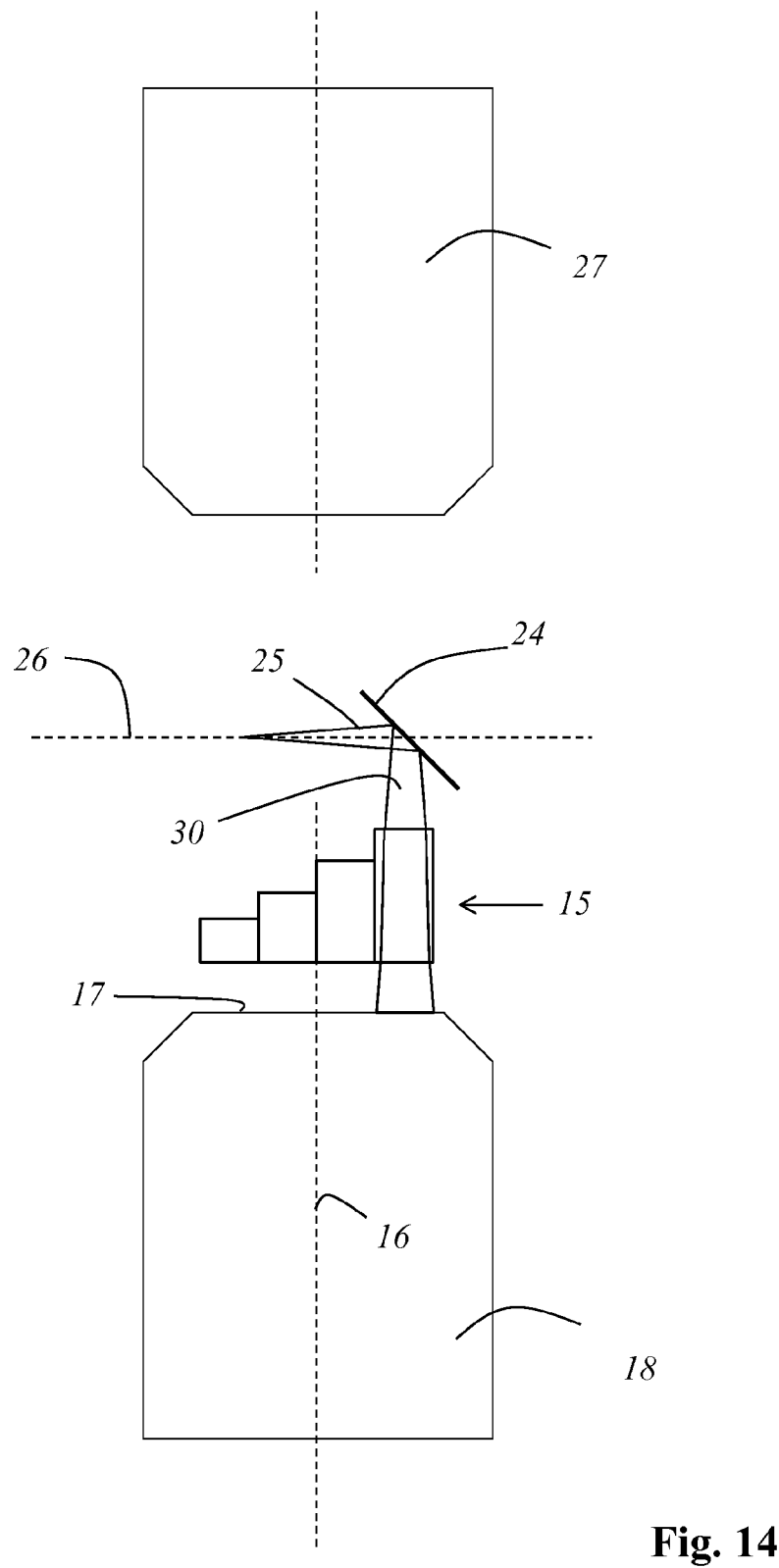
FIG. 14 shows a possible lighting arrangement of a light sheet microscope according to the invention.
Figure 15:
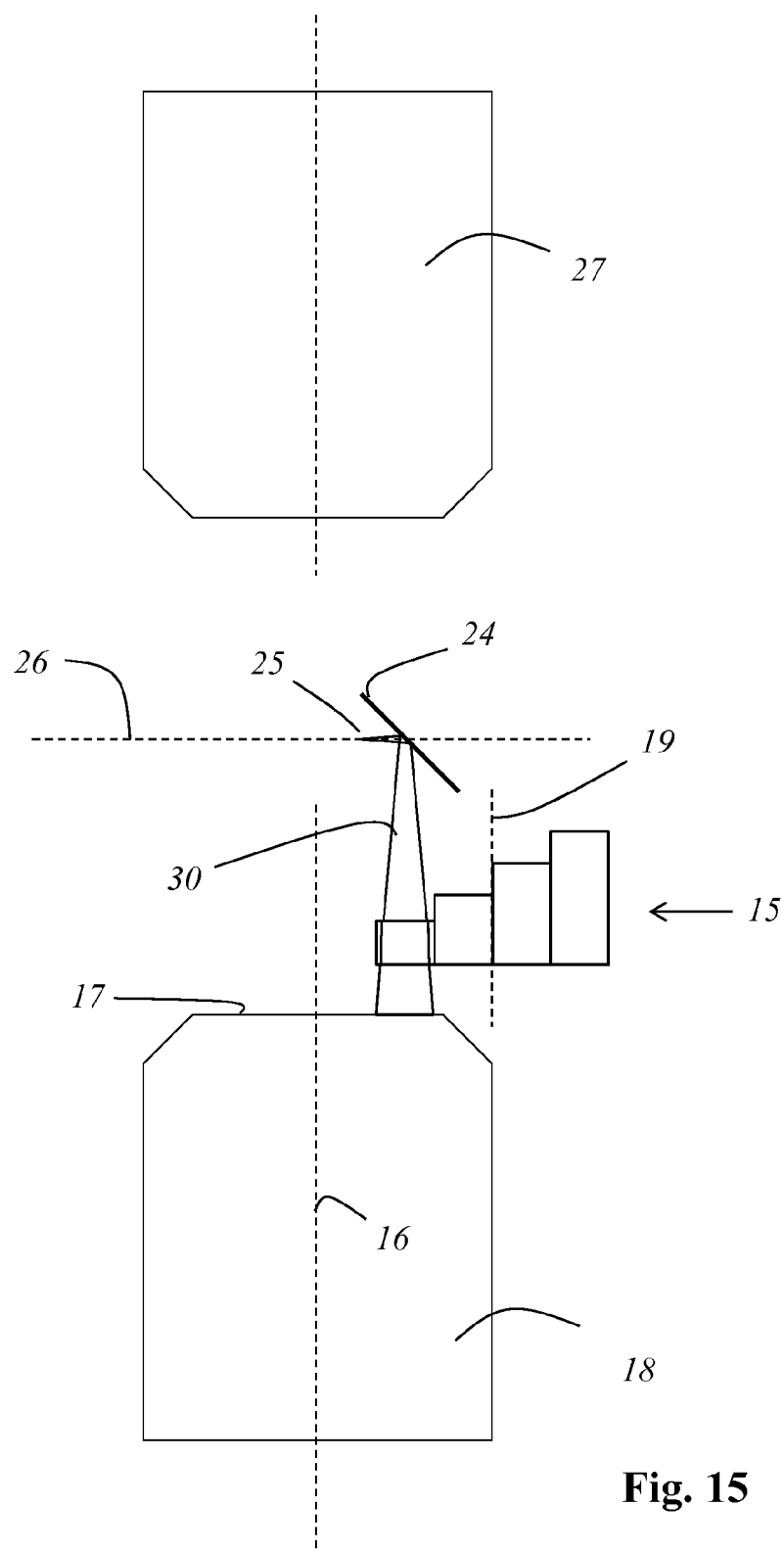
FIG. 15 shows another possible lighting arrangement of a light sheet microscope according to the invention.

FIGS. 14 and 15 show embodiments in which, in each case, a deflection means 24 deflects the illumination light into the illumination plane 26 after said light passes through the illumination objective 18 and passes a light sheet focal point shifting means 6, said illumination plane simultaneously being the focal plane of the detection objective 27. The detection objective 27 is arranged facing the illumination objective 18, wherein the optical axes are oriented coaxially with or in parallel with one another. As mentioned in the previous paragraph, the illumination objective can also be used to depict light from the plane 26 on a camera sensor.

In the embodiment shown in FIG. 14, a ring 15 is mounted in front of the front lens 17 of the illumination objective 18 so as to be able to rotate about the optical axis 16.

In the embodiment shown in FIG. 15, a ring 15 is mounted in front of the front lens 17 of the illumination objective 18 so as to be able to rotate about an axis 19 in parallel with the optical axis 16.

Should the light sheet focal point 5 be generated by the illumination objective 18 in such a way that not a collimated beam is shone into the entrance pupil of the illumination objective, but rather a divergent or convergent beam, then the light sheet focal point shifting means 6 can also be attached behind the illumination objective 18 and is thus further away from the potentially difficult-to-access region between the illumination objective 18 and the focal plane 26 of the detection objective 27, which also applies analogously to the other embodiments shown.

In general, the light sheet focal point shifting means can be arranged at another point in the illumination beam path at which the illumination light beam is not collimated, e.g. converges or diverges.

Figure 16:
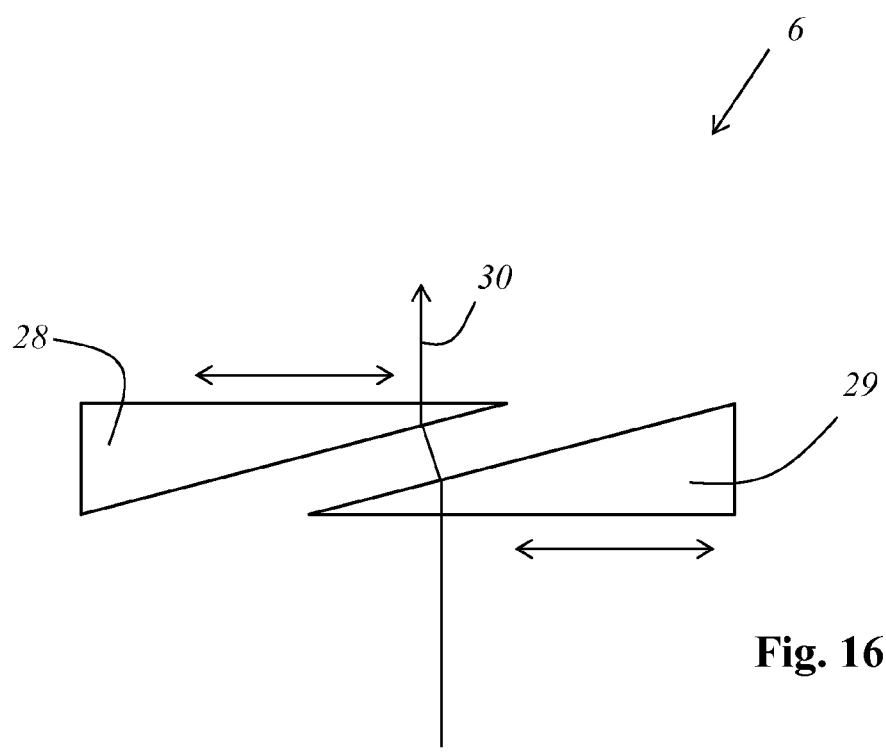
FIG. 16 is a side view of a fourth embodiment of a light sheet focal point shifting means.

FIG. 16 is a side view of a fourth embodiment of a light sheet focal point shifting means 6. The light sheet focal point shifting means 6 comprises two transparent wedge-shaped elements 28, 29 which are arranged in the beam path of the illumination light 30 and are moved relative to each other to change the optical length of the light path. However, this disadvantageously results in a beam offset.

Figure 17:
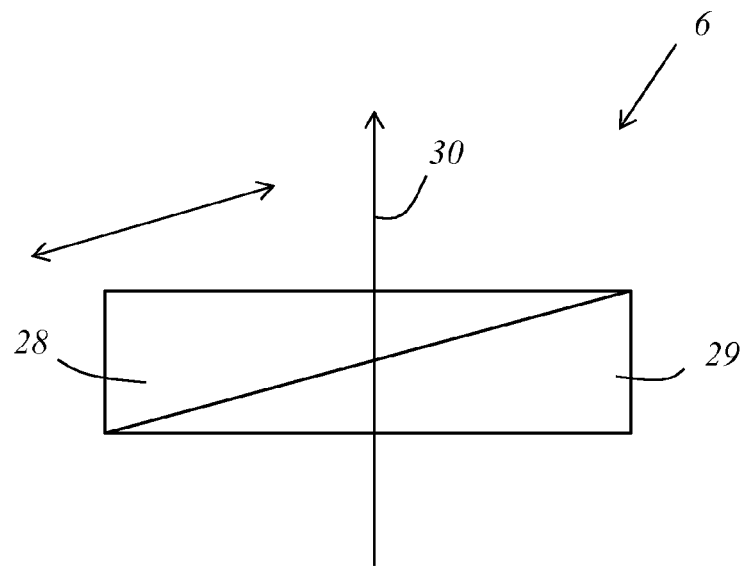
FIGS. 17 and 18 are respective side views of a fifth embodiment of a light sheet focal point shifting means.
Figure 18:
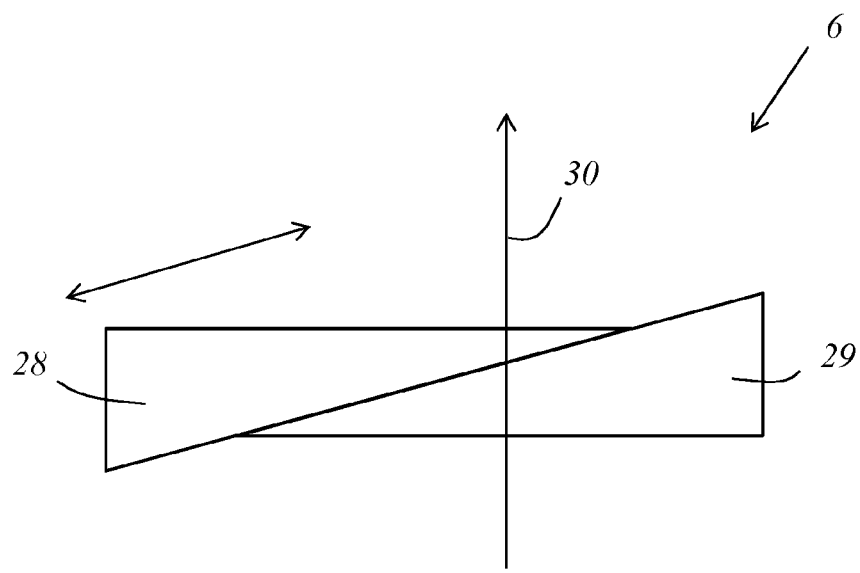

FIGS. 17 and 18 are respective side views of a fifth embodiment of a light sheet focal point shifting means 6.

The light sheet focal point shifting means 6 comprises two transparent wedge-shaped elements 28, 29 which are arranged in the beam path of the illumination light 30 and are in contact with one another via an immersion oil, which elements are moved relative to each other to change the optical length of the light path. This advantageously results in no beam offset.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 transparent block
2 transparent block
3 transparent block
4 transparent block
5 light sheet focal point
6 light sheet focal point shifting means
7 first block
8 second block
9 third block
10 fourth block
11 fifth block
12 sixth block
13 seventh block
14 eighth block
15 ring
16 optical axis
17 front lens
18 illumination objective
19 axis in parallel with (16)
20 side-by-side arrangement
21 annular element
22 web
23 central axis of symmetry
24 deflection means
25 light sheet
26 illumination plane
27 detection objective
28 wedge-shaped element
29 wedge-shaped element
30 illumination light

The invention claimed is:

1. A method for examining a sample by light sheet microscopy, the method comprising:
   illuminating a sample layer located in an illumination plane by a light sheet propagating in the illumination plane;
   moving a position of a light sheet focal point of the light sheet in the illumination plane by changing an optical length of a light path of illumination light forming the light sheet, the changing of the optical length comprising arranging a light sheet focal point shifter in a beam path of the illumination light; and
   detecting detection light emanating from the illumination plane.

2. The method according to claim 1, wherein the light sheet focal point shifter comprises:
   a. transparent blocks having different thicknesses and/or having different indexes of refraction introduced into the light path successively, and/or
   b. transparent blocks having different thicknesses and/or having different indexes of refraction introduced into the light path successively and interchangeably.

3. The method according to claim 2, wherein:
   a. the transparent blocks are interconnected to form an arc or a ring, and wherein the arc or the ring is rotated about an optical axis or about an axis in parallel with the optical axis so as to change the optical length in such a way that the illumination light passes through another block in each case, and/or
   b. the transparent blocks form a stepped ring having a thickness which increases along a helix and which falls off steeply at an angle of 360 degrees from the thickest transparent block to the thinnest transparent block, the stepped ring being rotated about an optical axis or about an axis in parallel with the optical axis so as to change the optical length, and/or
   c. the transparent blocks are different regions of an integrally produced member.

4. The method according to claim 1, wherein the light sheet focal point shifter comprises an element shone through by the illumination light and having a thickness which increases continuously along a web and/or having an index of refraction which increases continuously is moved relative to a beam path of the illumination light so as to change the optical length of the light path.

5. The method according to claim 4, wherein the element is annular and is rotatably mounted, and wherein the element is rotated about an optical axis or about an axis in parallel with the optical axis so as to change the optical length.

6. The method according to claim 1, wherein the light sheet focal point shifter comprises:
   a. two transparent wedge-shaped elements arranged in a beam path of the illumination light and moved relative to each other so as to change the optical length of the light path, or
   b. two transparent wedge-shaped elements arranged in a beam path of the illumination light, which are in contact with one another in a contact plane via an immersion fluid and moved relative to each other so as to change the optical length of the light path.

7. The method according to claim 1, wherein:
   a. in each case, solely detection light from the respective region illuminated by the light sheet focal point is detected, and/or b. in each case, solely detection light from the respective region illuminated by the light sheet focal point is detected, the successively obtained image data being assembled to form an overall image, and/or c. a detection region of a detector is moved in sync with the movement of the light sheet focal point.

8. The method according to claim 1, wherein:

a. the light sheet is generated using a cylindrical lens, or b. the light sheet is a quasi-light sheet which consists of an illumination light beam which is continuously moved back and forth in the illumination plane, or c. the light sheet is a quasi-light sheet which consists of an illumination light beam which is continuously moved back and forth in the illumination plane and has a beam-deflecting device with an adjustable deflection angle.

9. A light sheet microscope, comprising:

an illumination objective configured to focus a light sheet to illuminate a sample layer by the light sheet propagating in the illumination plane;

a light sheet focal point shifter arranged in a beam path of illumination light forming the light sheet and configured to move a position of a light sheet focal point of the light sheet in the illumination plane by changing an optical length of a light path of the illumination light; and a detection objective configured to pass detection light emanating from the illumination plane through to a detector.

10. The light sheet microscope according to claim 9, wherein the light sheet focal point shifter comprises a plurality of transparent blocks having different thicknesses and/or having different indexes of refraction.

11. The light sheet microscope according to claim 10, wherein the transparent blocks are interconnected to form an arc or a closed ring.

12. The light sheet microscope according to claim 11, wherein:

a. the arc or the ring is rotatably mounted, or b. the arc or the ring is mounted so as to be rotatable about an optical axis or about an axis in parallel with the optical axis, or c. the arc or the ring is rotatably mounted, an optical thickness of a shone-through region being dependent on a rotational position of the arc or the ring.

13. The light sheet microscope according to claim 9, wherein the light sheet focal point shifter comprises an element which is configured to be shone through by the illumination light and has a thickness which increases continuously along a web and/or an index of refraction which increases continuously along a web.

14. The light sheet microscope according to claim 13, wherein:

a. the element is mounted so as to be linearly movable, or b. the element is rotatably mounted, or c. the element is mounted so as to be rotatable about an optical axis or about an axis in parallel with the optical axis, or d. the element is rotatably mounted, an optical thickness of a shone-through region being dependent on a rotational position of the element.

15. The light sheet microscope according to claim 9, wherein:

a. the light sheet focal point shifter comprises two transparent wedge-shaped elements which are arranged in the beam path of the illumination light and are mounted so as to be movable relative to each other so as to change the optical length of the light path, or b. the light sheet focal point shifter comprises two transparent wedge-shaped elements arranged in the beam path of the illumination light, which are in contact with one another in a contact plane via an immersion fluid and are mounted so as to be movable relative to each other so as to change the optical length of the light path.

16. The sheet microscope according to claim 9, wherein:

a. the light sheet focal point shifter is connected downstream of the illumination objective, and/or b. the light sheet focal point shifter is spatially arranged between the illumination objective and the sample, and/or c. a ring or an element of the light sheet focal point shifter is arranged coaxially with the illumination objective.

17. The light sheet microscope according to claim 9, further comprising a cylindrical lens configured to shape the light sheet from a primary illumination light beam.

18. The light sheet microscope according to claim 9, further comprising:

a. a beam deflector with an adjustable deflection angle being configured to generate the light sheet as a quasi-light sheet by moving a primary illumination light beam back and forth in the illumination plane, or b. a beam deflector with an adjustable deflection angle being configured to generate the light sheet as a quasi-light sheet by moving a primary illumination light beam back and forth in the illumination plane so quickly that detection signals generated by the detector are indistinguishable from detection signals generatable using a light sheet generated by a cylindrical lens.

19. The light sheet microscope according to claim 9, wherein:

a. the detector is present, which, in each case, is configured to solely detect the detection light from a respective region illuminated by the light sheet focal point, and/or in that b. the detector is present, a respective active detection region of which is moveable by a control device in sync with the movement of the light sheet focal point.

20. The light sheet microscope according to claim 9, wherein:

a. an optical axis of the illumination objective and an optical axis of the detection objective are oriented in parallel with or coaxially with one another, and/or b. the detection objective and the illumination objective are oriented so as to be opposite and facing each other, and/or c. a deflector is connected downstream of the illumination objective and is configured to deflect the illumination light into the illumination plane after said the illumination light passes through the illumination objective, and/or d. a deflector is connected downstream of the illumination objective and is configured to deflect the illumination light after the illumination light has passed through the illumination objective in such a way that the deflected illumination light is at a non-zero-degree angle to an optical axis of the illumination objective and/or of the detection objective, and/or e. the illumination plane is oriented perpendicularly to an optical axis of the illumination objective and/or perpendicularly to an optical axis of the detection objective.

21. The light sheet microscope according to claim 9, wherein the light sheet microscope comprises a scanning microscope or a confocal scanning microscope and/or the light sheet microscope is produced by retrofitting a scanning microscope or a confocal scanning microscope.

* * * * *